(12) United States Patent
Wimmer et al.

(10) Patent No.: US 11,204,238 B2
(45) Date of Patent: Dec. 21, 2021

(54) METHOD AND COATING SYSTEM FOR COATING CAVITY WALLS

(71) Applicant: Sturm Maschinen- & Anlagenbau GmbH, Salching (DE)

(72) Inventors: Patrick Wimmer, Aufhausen (DE); Fabian Bernwinkler, Landshut (DE); Marc Kesting, Straubing (DE); Ralf Völlinger, Straubing (DE); Wolfgang Schütz, Lieblfing (DE)

(73) Assignee: STURM MASCHINEN- & ANLAGENBAU GMBH, Salching (DE)

( * ) Notice: Subject to any disclaimer, the term of this patent is extended or adjusted under 35 U.S.C. 154(b) by 429 days.

(21) Appl. No.: 15/543,986

(22) PCT Filed: Jan. 15, 2016

(86) PCT No.: PCT/EP2016/050777
§ 371 (c)(1),
(2) Date: Jul. 15, 2017

(87) PCT Pub. No.: WO2016/116367
PCT Pub. Date: Jul. 28, 2016

(65) Prior Publication Data
US 2018/0010905 A1 Jan. 11, 2018

(30) Foreign Application Priority Data

Jan. 20, 2015 (EP) .................................. 15 151 724
Feb. 20, 2015 (EP) .................................. 15 155 724

(51) Int. Cl.
| | | |
|---|---|---|
| *G01B 11/12* | (2006.01) | |
| *G01B 21/14* | (2006.01) | |
| *G01B 5/00* | (2006.01) | |
| *G01B 11/06* | (2006.01) | |
| *B05B 13/06* | (2006.01) | |
| *B05B 7/22* | (2006.01) | |
| *B05D 1/02* | (2006.01) | |
| *B05D 7/22* | (2006.01) | |
| *B05B 12/08* | (2006.01) | |
| *C23C 4/134* | (2016.01) | |
| *B05D 1/08* | (2006.01) | |

(52) U.S. Cl.
CPC ............ *G01B 11/12* (2013.01); *B05B 12/084* (2013.01); *B05B 13/0636* (2013.01); *B05D 1/02* (2013.01); *B05D 1/08* (2013.01); *B05D 7/22* (2013.01); *C23C 4/134* (2016.01); *G01B 5/003* (2013.01); *G01B 11/0683* (2013.01); *G01B 21/14* (2013.01); *B05B 7/226* (2013.01)

(58) Field of Classification Search
CPC .... B05D 7/22; B05D 1/02; B05D 1/08; B05B 12/084; B05B 13/0636; B05B 7/226; G01B 11/12; G01B 11/0683; G01B 5/003; G01B 21/14
USPC ......................................... 427/230, 236, 239
See application file for complete search history.

(56) References Cited

U.S. PATENT DOCUMENTS

| | | | |
|---|---|---|---|
| 7,851,046 B2 * | 12/2010 | Nishimura ............... | F16J 10/04 428/141 |
| 9,500,463 B2 * | 11/2016 | Killingbeck ............. | G01B 5/25 |
| 10,287,666 B2 * | 5/2019 | Ebenbeck ................. | C23C 4/08 |
| 2011/0023777 A1 | 2/2011 | Nishimura et al. | |
| 2014/0004255 A1 | 1/2014 | Whitbeck et al. | |

FOREIGN PATENT DOCUMENTS

| | | |
|---|---|---|
| CN | 101243329 A | 8/2008 |
| CN | 100529153 C | 8/2009 |
| CN | 101617220 A | 8/2009 |
| CN | 102084210 A | 6/2011 |
| CN | 102927950 A | 2/2013 |
| CN | 103506258 A | 1/2014 |
| DE | 19934991 A1 | 7/1999 |
| DE | 102010025277 A1 | 12/2011 |
| DE | 102013211873 A1 | 1/2014 |
| JP | 2002286137 A | 10/2002 |
| JP | 2007069217 A | 3/2007 |
| JP | 20088240560 A | 10/2008 |
| JP | 2009120941 A | 6/2009 |
| JP | 2010209454 A | 9/2010 |

(Continued)

OTHER PUBLICATIONS

Enovasense informational document, 10 pages, date unknown. (Year: UNKN) (Year: UNKN) (Year: UNKN).*

(Continued)

*Primary Examiner* — William P Fletcher, III
(74) *Attorney, Agent, or Firm* — Dinsmore & Shohl LLP

(57) ABSTRACT

The invention relates to a method for coating cavity walls, in particular cylinder bores of engine blocks. In the method, a coating is applied to a cavity wall using a coating lance. In addition, a cavity diameter is measured using a measuring apparatus. According to the invention, the method is characterized in that at least a plurality of diameter values of a first cavity are measured at different heights of the first cavity using the measuring apparatus, and in that a coating of variable thickness is applied to a wall of the first or a second cavity using the coaling lance, the thickness of said coating of variable thickness being dependent on the determined diameter values. The invention additionally describes a corresponding coating system.

20 Claims, 2 Drawing Sheets

(56) References Cited

FOREIGN PATENT DOCUMENTS

WO   2009152851 A1   12/2009

OTHER PUBLICATIONS

Figure 1:
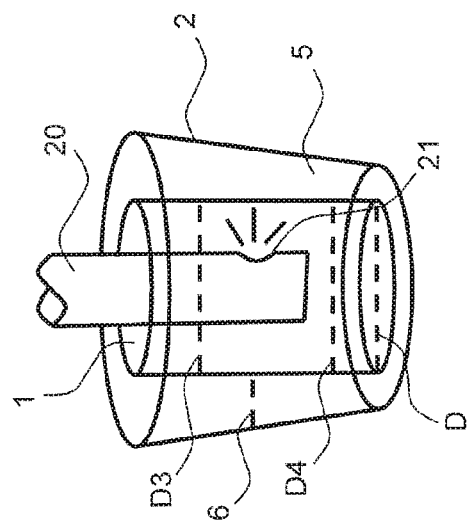

International Search Report with English translation and Written Opinion dated Jul. 28, 2016 for PCT/EP2016/050777 filed Jan. 15, 2016.
Notification of Reasons for Refusal dated Mar. 1, 2019 relating to Japanese Patent Application No. 2017-537398 filed Jan. 15, 2016.
Chinese Office Action dated Mar. 1, 2019 relating to CN Patent Application No. 201680004638.X.

* cited by examiner

METHOD AND COATING SYSTEM FOR COATING CAVITY WALLS

The present invention relates in a first aspect to a method for coating cavity walls, in particular cylinder bores of engine blocks, in accordance with the preamble of claim 1.

In a second aspect the invention relates to a coating system for coating cavity walls, in particular cylinder bores of engine blocks, in accordance with the preamble of claim 11.

An engine block of such type can be used for combustion engines of motor vehicles for example. It comprises several cylinder bores, the dimensions and wall properties of which have to meet precise requirements in order to ensure the highest possible efficiency of the combustion engine. In the present case, a cylinder bore can generally be understood as a cylindrical cavity with a round, in particular a circular cross section. On the inner wall of a cylinder bore a coating is applied which has to meet requirements with regard to its layer thickness with the highest possible precision.

The properties of such a coated cavity are examined with a generic method. In such a method for coating cavity walls, in particular cylinder bores of engine blocks, provision is made for a coating to be applied to a cavity wall with a coating lance and a cavity diameter to be measured with a measuring device.

Accordingly, a generic coating system for coating cavity walls, in particular cylinder bores of engine blocks, comprises a coating lance for applying a coating to a cavity wall and a measuring device for measuring a cavity diameter.

A coating system, in which the applied coating is subject to subsequent examination is known from DE 199 34 991 A1.

The drawback with known coating systems is that in many cases the actual dimensions of a coated cavity show undesirably high deviations from target values which can at best be established in a test but not be prevented.

An object of the invention can be considered to reside in the provision of a coating system and a method for coating cavity walls, with which a cavity wall can be coated as precisely as possible.

This object is achieved by the method having the features of claim 1 and by the coating system having the features of claim 11.

Advantageous variants of the method according to the invention and the coating system according to the invention are the subject matter of the dependent claims and are furthermore set out in the following description.

In the method of the type stated above, according to the invention at least several diameter values of a first cavity are measured with the measuring device at different heights of the first cavity. Subsequently, with the coating lance a variable-thickness coating is applied to a wall of the first or a second cavity, the thickness of the said variable-thickness coating being dependent on the diameter values determined.

Accordingly, in the coating system stated above, according to the invention electronic control means are provided and adapted to record with the measuring device at least several diameter values of a first cavity at different heights of the first cavity and to apply with the coating lance a variable-thickness coating to a wall of the first or a second cavity, the thickness of the said variable-thickness coating being dependent on the diameter values determined.

A core idea of the invention can be considered to reside in the fact that a diameter determination of the cavity is used to have an influence on a subsequent coating and bring it closer to a desired result. By contrast, in known coating systems a measurement of the coated cavity wall is normally only used for quality assessment rather than for an improvement of subsequent coating processes.

Basically, in the production of coated hollow bodies two inaccuracies occur, of which one or both can advantageously be reduced by the invention. On the one hand, before coating a cavity diameter can deviate from a desired diameter. In particular, the cavity diameter can vary undesirably across the height of the cavity. This undesirable deviation remains even if a coating were to be applied that does not show any inaccuracies in its thickness and has a precisely constant thickness across the height of the cavity.

In addition, a second inaccuracy occurring in the production of coated hollow bodies is that a thickness of an applied coating generally shows a deviation from a desired thickness. In particular, undesired variations of the coating thickness across the height of the cavity can arise. This may, in particular, be due to whirls of air during the application of the coating. These can be caused e.g. by exhaustion during the coating process.

Advantageously, by way of the invention both or at least one of the aforementioned inaccuracies can be reduced. For instance a height-dependent cavity diameter can be detected before coating and a deviation from a desired cavity diameter can be calculated. The coating to be applied subsequently is produced such that this deviation is compensated at least partially, by preference completely.

Alternatively or additionally, a height-dependent determination of the diameter can also be carried out after application of the coating. In this way, a deviation of the applied coating from a desired coating can be determined. In a subsequent coating of a next cavity wall the coating to be applied can then be produced such that the previously stated deviation is compensated at least partially, by preference completely.

The control of the coating process in accordance with the invention can therefore also constitute a regulation. In this, the cavity diameter after application of the coating is the regulation variable, i.e. the variable to be influenced. This is measured and a difference to a desired value is calculated. On the basis of the difference a correcting variable is then calculated which is in this case the height-dependent thickness of the coating to be applied (to a subsequent cavity wall).

If diameter values of a first cavity are only measured at different heights before application of a coating, these diameter values are used to influence the application of a variable-thickness coating to the wall of the same (first) cavity. If, however, diameter values are measured after or both before and after application of a coating, then these diameter values can be used to influence the application of a variable-thickness coating to the wall of a subsequent (second) cavity.

A coating lance can be understood in the present case as any means which can be moved into a cavity to be coated and then release coating particles in the direction of the cavity wall. The coating lance can in particular have an elongate shape with a discharge opening facing in a direction transverse, especially perpendicular to the longitudinal direction of the coating lance. The ejected coating particles can in particular comprise metal particles that are conveyed in a plasma jet. Provision can be made for the coating lance to rotate and be adjusted in height during a coating process.

The measuring device can in principle have one or several sensors of arbitrary type for determining a cavity diameter. It is essential that the measuring device is able to determine the cavity diameter in a height-dependent manner, i.e. at different heights along the longitudinal axis of the cavity. Basically, a single distance-measuring sensor that measures its distance to the cavity wall can be sufficient. From this distance the diameter can then be calculated. However, this approach is relatively inaccurate if the measuring device is not moved centrally into the cavity but with a deviation from the center axis. In order to be able to determine the diameter precisely even in such a case, provision can preferably be made for at least three distance-measuring sensors. In particular, these can measure a distance optically, for instance according to the triangulation principle. The sensors can be arranged in such a manner on the measuring device that their measuring directions lie transversely or perpendicularly to a longitudinal axis of the measuring device and differ at an angle around the longitudinal axis. Each of these sensors measures in its measuring direction a distance to the cavity wall. In the case of a deviation of the measuring device from the center axis of the cavity, one of the sensors measures a smaller distance while another of the sensors measures a greater distance. In this way, the deviation can be calculated and the cavity diameter can be determined precisely.

A variable-thickness coating can in the present case be understood in that the thickness of the coating is not constant but varies in particular across a height of the cavity wall, to which the coating is applied.

Within the meaning of the invention those measures are to be considered as being equivalent to the diameter of the cavity if the diameter can be derived from these measures. These include, in particular, the radius, circumference or cross-sectional surface of the cavity at an examined height. The height is to be understood as being along a longitudinal axis of the cavity which normally has a cylindrical or at least a regular shape. As set out, on the cylindrical shape an undesired deviation can be present, which may result, for example, in a conical cylinder or a cylinder that has a constant circular cross-section but whose diameter varies across the height and with irregularity in particular.

In a preferred method variant the several diameter values are measured on the first cavity before a coating is applied to its wall. The variable-thickness coating is then applied to the same first cavity, on which the several diameter values were measured.

Alternatively or additionally, provision can be made for several diameter values to be measured on the first cavity after a coating has been applied to its wall. The variable-thickness coating can now be applied to a wall of the second cavity which is coated after the wall of the first cavity has been coated. In principle, the coating of the wall of the first cavity can in this case be carried out with a constant thickness or, as described before, preferably with a thickness depending on the diameter of the cavity before coating.

It may be advantageous if a thickness of the variable-thickness coating is chosen the thicker at a particular height the larger the previously measured diameter value for this height is. Accordingly, the coating is thicker in parts, in which the diameter, i.e. the internal diameter of the uncoated cavity or of another cavity already coated (which will be described in greater detail at a later stage) is larger. Advantageously, this ensures that across the height of the cavity as constant a diameter as possible is achieved after coating.

By preference, the variable-thickness coating is applied such that its variable thickness compensates at least partially, by preference completely for differences of the diameter values. The partial compensation is to be understood in that diameter differences across the height of the coated cavity are smaller as compared to the case of the same cavity being coated with a coating of constant thickness. A complete compensation can be understood in that a sum of a diameter value of the uncoated cavity and the coating thickness belonging to this height results in the same value for all heights. In other words, in this case the coated cavity has the same diameter across its height. Thus, the variable-thickness coating is applied in such a manner to the cavity walls that a coated cavity has a substantially constant cavity diameter. Cavities coated in succession can differ in their coating thicknesses such that different diameters before coating are compensated and the coated cavities thus have a substantially equal cavity diameter.

The dependence of the variable-thickness coating on the determined diameter values can also be considered as a dependence on values derived from the determined diameter values. In particular, these values can be height-dependent coating thicknesses on the first cavity. The height-dependent coating thicknesses can be determined by measuring diameter values on the same cavity before and after application of a coating and by subsequently determining the difference between these diameter values.

In order to realize these features provision can be made in that:
  with the measuring device several diameter values of the first cavity are recorded at different heights of the first cavity before and after application of a coating,
  from these diameter values before and after application of a coating a height-dependent coating thickness is determined,
  the coating lance is actuated such that with this a variable-thickness coating is applied to a wall of the second cavity, the thickness of the said variable-thickness coating being dependent on the determined height-dependent coating thickness.

With this embodiment the problem is addressed that an actual coating thickness generally deviates from an intended or desired coating thickness. This deviation can be established and taken into account. For example, if a measurement shows that an actual coating thickness is smaller than intended at a particular height, the coating thickness is chosen larger for a subsequent (in particular second) cavity. This procedure can be repeated: If the coating thickness at this height is still not large enough, then the coating thickness for this height will again be increased for the next cavity.

In a preferred variant of the invention several of the previously stated embodiments are combined. In particular, it can be envisaged that a height-dependent coating is chosen both depending on diameter values of the cavity before coating and depending on diameter values of the most recently examined cavity already coated. A preferred variant comprises the following steps:

Initially, several diameter values are measured on the first cavity before a coating is applied thereto. Subsequently, the variable-thickness coating is applied to the same first cavity, wherein its height-dependent thickness is chosen depending on the diameter values before application of the coating. Several diameter values are now measured on the first cavity after the stated coating has been applied to its wall.

From the diameter values before and after application of the coating a height-dependent coating thickness is determined. With the determined height-dependent coating thickness a difference to a desired height-dependent coating thickness is calculated. The difference is taken into account during application of a coating to a subsequent cavity wall. In particular, the thickness of the coating on the subsequent cavity wall is chosen such that upon repeated implementation of these method steps the stated difference is reduced.

In principle, the variable-thickness coating can be produced in any chosen way. In order to be able to employ generally known coating lances in a simple manner for the invention a movement speed or particle ejection capacity of the coating lance is preferably varied.

The characteristics of the invention described as additional device features are also to be considered as variants of the method according to the invention and vice versa. More particularly, in preferred embodiments of the coating system according to the invention the electronic control means are adapted to carry out one or several of the above-described steps, i.e. in particular to actuate the coating lance and the measuring device correspondingly.

Within the framework of the present description terms such as "cavity wall" and "wall of a cavity" are to be regarded as synonymous. The same applies to pairs of terms such as "cavity diameter" and "diameter of a cavity".

Figure 2:
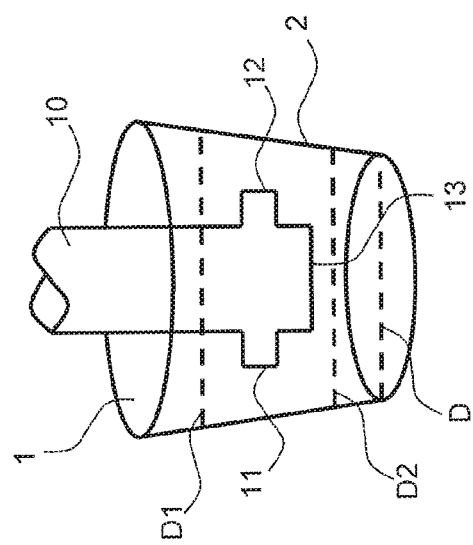
Figure 4:
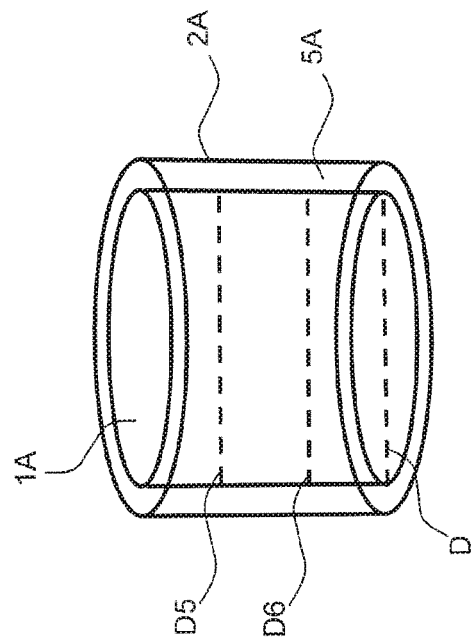
Figure 3:
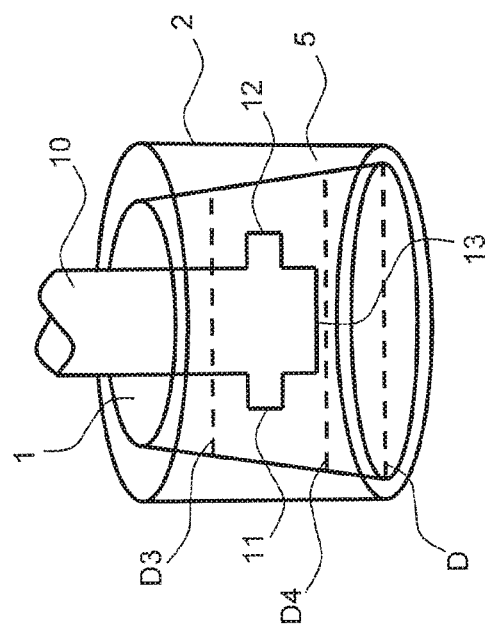

Further advantages and features of the invention will be described hereinafter with reference to the accompanying schematic Figures, wherein show:

FIG. 1 a measuring device of a coating system according to the invention in an as yet uncoated cavity;

FIG. 2 a coating lance of a coating system according to the invention in a cavity coated in accordance with the method of the invention;

FIG. 3 a measuring device of a coating system according to the invention in a coated cavity;

FIG. 4 a cavity coated in accordance with the method of the invention.

Identical components and those having the same effect are generally marked in the Figures with the same reference signs.

FIG. 1 schematically shows a measuring device 10 of an embodiment of a coating system according to the invention. The measuring device 10 has moved into a cavity 1 which can be a cylinder bore 1 of an engine block in particular.

Side walls 2 of the cavity are to be coated, whereby desired wall properties can be achieved that can improve an engine efficiency for example.

The side walls 2 are formed by the lateral surface of the cavity 1 and are also referred to in short as "wall 2" in the present case.

Before coating the wall 2 a diameter D of the cavity 1 is determined using the measuring device 10. For this purpose, the measuring device 10 comprises sensors 11 and 12 in particular. Further measuring means 13 can be present for additional tests of wall properties, with regard to roughness for instance.

The measuring device 10 has an elongate body so that it can be moved into the cavities 1 to be examined. The sensors 11 and 12 are preferably formed as distance-measuring sensors. They determine their distance to the wall 2, from which the diameter D can be deduced. By preference, three distance-measuring sensors are present, of which only two sensors 11 and 12 are depicted. Thus, it is not necessary for the measuring device 10 to be moved centrally into the cavity 1 in order to determine the diameter D with precision.

For greater measuring accuracy it is advantageous if the sensors 11 and 12 are adjustable in a plane located perpendicular to a longitudinal axis of the elongate measuring device 10. This allows the sensors 11 and 12 to be moved closer to the wall 2.

As a result, high-precision sensors 11 and 12 can be used which, however, have a relatively small measuring range and therefore have to be moved close to the wall 2 for a distance measurement.

As a rule, an actual diameter D of the cavity 1 shows a deviation from a target value of the diameter. Moreover, the diameter D can show undesirable height dependence, i.e. the diameter has different values across the height of the cavity 1. For better visibility this is not represented true to scale in FIG. 1.

To detect the height dependence of the diameter D the measuring device 10 is adjusted in its height and records several diameter values D1 and D2 for different heights.

The knowledge of the height-dependent diameter D can now be used in a subsequent coating of the wall 2.

This is explained with reference to FIG. 2. FIG. 2 shows the cavity 1 of FIG. 1, in which case a coating 5 is applied to the wall 2 by a schematically illustrated coating lance 20.

The coating lance 20 has a discharge opening 21, from which coating particles are ejected in the direction of the wall 2. In particular, metal particles can be emitted in a plasma jet.

Conventionally, a target coating thickness would have a constant value across the height of the cavity. However, with such a coating the undesirable height dependence of an internal diameter of the coated cavity would still be present. By contrast, according to the invention a variable-thickness coating 5 is produced, the thickness 6 of which varies across the height of the cavity 1. This variation of thickness is chosen depending on the previously determined diameter values D1 and D2 of the uncoated cavity 1. In particular, the variation of thickness can be effected precisely such that differences between the diameters D1 and D2 are compensated, as illustrated in FIG. 2. As a result, a constant diameter D3 and D4 is attained across the height of the cavity 1.

Advantageously, the diameter determination can therefore be used to reduce or even completely eliminate a height dependence of the internal diameter D of a cavity 1.

In addition to height dependence a deviation from a target value of the diameter of a coated cavity can also be determined: To this end, for each of the diameter values D1 and D2 of the uncoated cavity 1 the respective difference to the target value is calculated. The thickness 6 of the coating is now chosen such that it is precisely equal to the respective aforementioned difference at the different heights.

Inaccuracies having an impact on the internal diameter D of a coated cavity 1 can also arise from the coating process. As a rule, an actual coating thickness 6 deviates from a predetermined desired coating thickness. This can be due to air currents in the cavity 1 for example.

This problem is illustrated in FIG. 3. The Figure shows a coated cavity 1. The diameter D of this coated cavity 1 shows undesirable height dependence. As set out, this can occur regardless of whether a diameter of the uncoated cavity 1 has a constant value (as is the case in FIG. 3) or shows height dependence (as is the case in FIGS. 1 and 2).

The height-dependent diameter D of the coated cavity 1 (i.e. the diameter of the free space enclosed by the coating 5) is now measured with the measuring device 10 at different heights. By way of example the diameters D3 and D4 are depicted at different heights.

The knowledge of these values provides information as to how an actual coating thickness 6 deviates from a desired coating thickness. For this purpose, diameter values D1 and D2 before coating and diameter values D3 and D4 after coating can also be measured on the same cavity 1 and the actual coating thickness 6 can be calculated by forming the difference.

A comparison of the actual coating thickness 6 with a desired coating thickness can now be used for controlling a subsequent coating process on a following cavity.

While FIG. 3 shows a first cavity 1 with a first coating 5, in FIG. 4 a subsequent (second) cavity 1A is shown, to the wall 2A of which a second coating 5A is applied. During application of the coating 5A the previously mentioned comparison of the actual coating thickness 6 with a desired coating thickness of the first cavity 1 is taken into consideration. In particular, the coating lance 20 can be actuated such that at a height, at which the actual coating thickness 6 was too low on the first cavity 1, a thicker coating 5A is produced on the second cavity 1A.

Advantageously, this makes it possible to avoid undesirable deviations of the actual coating thickness from a desired coating thickness.

Especially precise results can be achieved if a variable-thickness coating is chosen on the one hand depending on the previously outlined comparison of the actual coating thickness with a desired coating thickness of the previous cavity (described with reference to FIGS. 3 and 4) and on the other hand depending on the height-dependent diameter values of the uncoated cavity currently to be coated (described with reference to FIGS. 1 and 2). In this way, the achievement can be brought about that a diameter of a coated cavity precisely assumes a predetermined, in particular constant value across the height of the said cavity.

The invention claimed is:

1. A method for coating cavity walls of an engine block, the method comprising:
   measuring at least two first diameter values at at least two different heights of a first cavity with a measuring device; and
   applying a variable-thickness coating to a cavity wall of the first cavity with a coating lance, wherein the thickness of the variable-thickness coating is such that the thickness of the variable-thickness coating is thicker at the larger of the at least two first diameter values.

2. The method of claim 1, further comprising applying a variable-thickness coating to a cavity wall of a second cavity, wherein the thickness of the variable-thickness coating for the second cavity is such that the cavity diameters of the first cavity and the second cavity are substantially equal to one another.

3. The method of claim 1, further comprising measuring at least two second diameter values at the at least two different heights of the first cavity after the variable-thickness coating is applied to the cavity wall of the first cavity.

4. The method of claim 3, further comprising applying a variable-thickness coating to a cavity wall of a second cavity, wherein the variable-thickness coating for the second cavity compensates at least partially for differences between the at least two first diameter values and the at least two second diameter values.

5. The method of claim 1, wherein the variable-thickness coating is applied to the cavity wall of the first cavity such that the coated first cavity has a substantially constant cavity diameter.

6. The method of claim 1, further comprising applying a plurality of additional variable-thickness coatings to cavity walls of a plurality of additional cavities, wherein the plurality of additional variable-thickness coatings are such that the cavity diameters of the plurality of coated additional cavities and the cavity diameter of the coated first cavity are substantially equal to one another.

7. The method of claim 1, further comprising:
   measuring at least two second diameter values at the at least two different heights of the first cavity after the variable-thickness coating is applied to the cavity wall of the first cavity;
   determining a height-dependent coating thickness from the at least two first diameter values and the at least two second diameter values; and
   applying a variable-thickness coating to a cavity wall of a second cavity, wherein the thickness of the variable-thickness coating for the second cavity is such that the cavity diameters of the first cavity and the second cavity are substantially equal to one another.

8. The method of claim 1, further comprising:
   measuring at least two second diameter values at the at least two different heights of the first cavity after applying the coating to the cavity wall;
   determining a height-dependent coating thickness from the at least two first diameters values and the at least two second diameters values;
   calculating a difference between the height-dependent coating thickness and a desired height-dependent thickness; and
   applying a variable-thickness coating to a cavity wall of a second cavity, wherein the variable-thickness coating for the second cavity is the difference between the height-dependent coating thickness and the desired height-dependent thickness.

9. The method of claim 1, wherein the variable-thickness coating is produced in that a movement speed or particle ejection capacity of the coating lance is varied.

10. A method for coating cavity walls of an engine block, the method comprising:
    measuring at least two first diameter values at at least two different heights of a first cavity with a measuring device;
    applying a coating to a cavity wall of the first cavity with a coating lance;
    measuring at least two second diameter values at the at least two different heights after applying the coating to the cavity wall of the first cavity;
    determining a height-dependent coating thickness from the at least two first diameter values and the at least two second diameter values; and
    applying a variable-thickness coating to a cavity wall of a second cavity with the coating lance, wherein the thickness of the variable-thickness coating for the second cavity is such that the cavity diameters of the first cavity and the second cavity are substantially equal to one another.

11. The method of claim 10, wherein the variable-thickness coating for the second cavity compensates at least partially for differences between the at least two first diameter values and the at least two second diameter values.

12. The method of claim 10, wherein the variable-thickness coating is applied to the cavity wall of the second cavity such that the coated second cavity has a substantially constant cavity diameter.

13. The method of claim 10, further comprising applying a plurality of additional variable-thickness coatings to cavity walls of a plurality of additional cavities, wherein the plurality of additional variable-thickness coatings are such that the cavity diameters of the plurality of coated additional cavities and the cavity diameter of the coated second cavity are substantially equal to one another.

14. The method of claim 10, further comprising calculating a difference between the height-dependent coating thickness and a desired height-dependent thickness, wherein the thickness of the variable-thickness coating for the second cavity is the difference between the height-dependent coating thickness and the desired height-dependent thickness.

15. The method of claim 10, wherein the variable-thickness coating is produced in that a movement speed or particle ejection capacity of the coating lance is varied.

16. A coating system for coating cavity walls having:
a coating lance for applying a coating to a cavity wall of a cavity;
a measuring device for measuring a cavity diameter; and
an electronic control means, the electronic control means being adapted to:
record with the measuring device at least two diameter values of a first cavity corresponding to at least two different heights of the first cavity; and
apply with the coating lance a variable-thickness coating to a wall of the first cavity, wherein the thickness of the variable-thickness coating is such that the thickness of the variable-thickness coating is thicker at the larger of the at least two first diameter values.

17. The system of claim 16, wherein the electronic control means is further adapted to apply a variable-thickness coating to a cavity wall of a second cavity, wherein the thickness of the variable-thickness coating for the second cavity is such that the cavity diameters of the first cavity and the second cavity are substantially equal to one another.

18. The system of claim 16, wherein the electronic control means is further adapted to measure at least two second diameter values corresponding to the at least two different heights of the first cavity after the variable-thickness coating is applied to the cavity wall of the first cavity.

19. The system of claim 18, wherein the electronic control means is further adapted to apply a variable-thickness coating to a cavity wall of a second cavity, wherein the variable-thickness coating for the second cavity compensates at least partially for differences between the at least two first diameter values and the at least two second diameter values.

20. The system of claim 16, wherein the variable-thickness coating is applied to the cavity wall of the first cavity such that the coated first cavity has a substantially constant cavity diameter.

* * * * *